Sept. 11, 1962 T. SHELLEY 3,053,504
METHOD OF ASSEMBLING A BLADED MEMBER
Filed Dec. 27, 1960
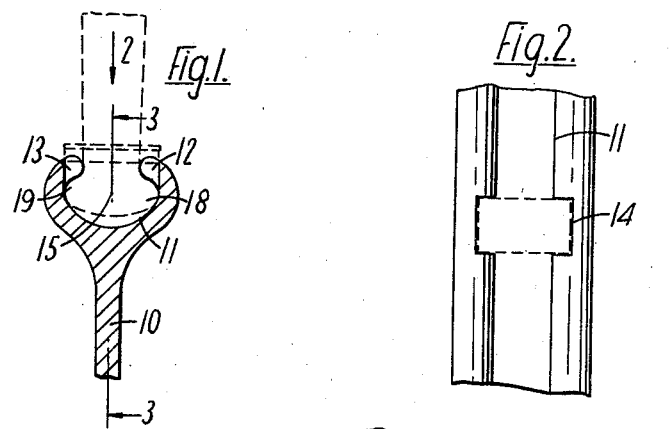
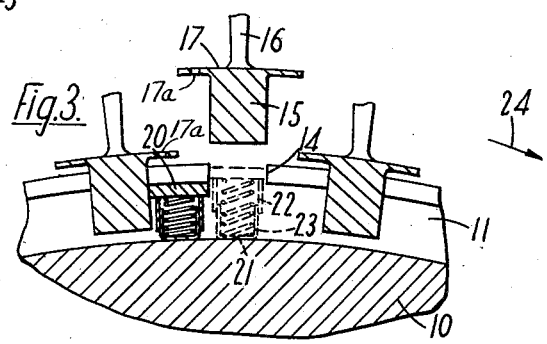
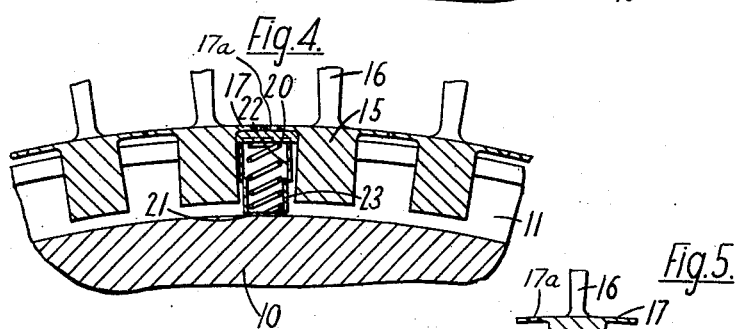
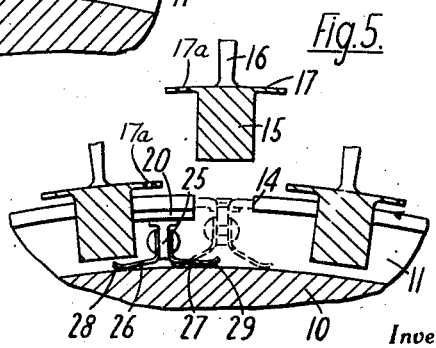
Inventor
Thomas Shelley
By Cushman, Darby & Cushman
Attorneys United States Patent Office 3,053,504
Patented Sept. 11, 1962

3,053,504
METHOD OF ASSEMBLING A BLADED MEMBER
Thomas Shelley, Breaston, England, assignor to Rolls-Royce Limited, Derby, England, a company of Great Britain
Filed Dec. 27, 1960, Ser. No. 78,603
Claims priority, application Great Britain Jan. 18, 1960
5 Claims. (Cl. 253—77)

This invention concerns a method of assembling a bladed member and, although the invention is not so restricted, it will for convenience hereinafter be described with reference to the fixing in position of the blades of a gas turbine compressor rotor.

Methods previously adopted for fixing blades into a compressor rotor have commonly suffered from the disadvantages of making the rotor expensive or difficult to build and of adding unnecessarily to its weight. Thus if the blades are provided with "fir tree" roots and are inserted into correspondingly shaped slots in the compressor rotor the construction is expensive, whilst if each blade is pinned in position the weight of the rotary parts and the stresses caused by centrifugal forces are increased.

The object of the present invention is therefore to overcome the said disadvantages.

According to the present invention there is provided a method of assembling a bladed member comprising introducing the roots of a number of blades, one at a time, into a localised widened portion of a groove in the bladed member, moving each root within said groove away from said localised widened portion and into a position in which shoulders on the root are engaged behind inwardly projecting shoulders bounding the groove, and, when the root of the last blade has been so introduced and positioned, locking into the said localised widened portion a closure member which prevents withdrawal of the roots from the groove.

Preferably the closure member, when locked into the localised widened portion, engages an adjacent blade or blades so as to prevent relative movement between said blades and said bladed member.

The closure member is preferably acted upon by spring means which, when the closure member is placed in the said localised widened portion, urges the closure member into the locked position.

Locking of the closure member may be effected by first introducing the closure member into the groove through the localised widened portion, and, by maintaining the spring means depressed, thereafter moving it longitudinally of the groove away from said localised widened portion, whereafter the root of the last blade is introduced into the groove through said localised widened portion and the roots of the complete assembly of blades are moved longitudinally of the groove so as to bring the closure member into alignment with the localised widened portion, whereupon the spring means moves the closure member into the locked position.

The bladed member may be a rotary member provided with two diametrically opposed localised widened portions in order to ensure balancing of the bladed member. Alternatively such balancing may be effected by making the weight of the closure member and its spring means equal to the weight of the material removed from the bladed member to form the localised widened portion.

The invention also comprises a bladed member (e.g. a compressor rotor) assembled by the method set forth above.

The closure member is preferably of a shape corresponding to the localised widened portion of the groove, and the said localised widened portion (or each said localised widened portion) is preferably constituted by a slot extending transversely of the groove.

Means may be provided for moving the closure member out of the locked position so as to permit withdrawal of the blades. Thus at least one of the blades adjacent said closure member may have an opening through which may be introduced a tool to effect depression of the closure member against its spring means.

The invention is illustrated, merely by way of example, in the accompanying drawings, in which:

FIGURE 1 is a cross section through part of a compressor rotor disc of a gas turbine engine,
FIGURE 2 is a broken away plan view looking in the direction of the arrow 2 of FIGURE 1,
FIGURE 3 is a diagrammatic, broken away, section taken on the line 3—3 of FIGURE 1 and illustrating the way in which assembling of the blades in the rotor takes place,
FIGURE 4 is a view similar to FIGURE 3 but showing part of an assembled rotor, and
FIGURE 5 is a view similar to FIGURE 3 but showing a modified construction.

Referring to the drawings, a gas turbine compressor rotor disc 10 is provided with a circumferential groove 11. The groove 11 is bounded by inwardly projecting arcuate shoulders 12, 13, the shoulders 12, 13 being provided at the periphery of the disc 10. The groove 11 has a locally widened portion in the form of an elongated slot 14 which extends transversely of the groove 11.

The roots 15 of the blades 16 are adapted to be introduced into the groove 11 through the slot 14. Each root 15 is provided with a platform 17 and with shoulders 18, 19 which are adapted to be engaged behind the shoulders 12, 13 respectively.

A plate 20, acted upon by a coil spring 21, has a shape corresponding to that of the slot 14 and is provided for effecting closure of the slot. The spring 21 is retained in a two-part, telescopic housing 22, 23 of which the part 22 is integral with or secured to the plate 20, the part 23 being mounted within the part 22 and being slidable along the bottom of the groove 11.

The compressor rotor shown in the drawings is assembled by first introducing the root 15 of a blade 16 through the slot 14 and into the groove 11. After it has been so introduced, the root 15 is moved circumferentially in the groove 11 so that the shoulders 12, 13 become engaged behind the shoulders 18, 19. This procedure is repeated with the remaining blades 16 until there is only one space left for one more blade.

Prior to the insertion of the final blade, the plate 20 is introduced into the slot 14 and is pressed towards the axis of the disc 10 against the action of the spring 21 until it is disposed inwardly of the shoulders 12, 13. The plate 20 in then moved (as indicated in full lines in FIGURE 3) into a position in which it no longer blocks the slot 14.

The root 15 of the final blade 16 is then inserted through the slot 14 so that its root platform 17 engages with the root platforms of adjacent blades. The whole blade assembly is then moved relatively to the disc 10 in the direction of the arrow 24. When, as a result of this movement, the plate 20 becomes aligned with the slot 14, the spring 21 will cause the plate 20 to move into the slot 14 and into engagement with the platforms 17 of the adjacent blades 16. In this position, the plate 20, which will be partly located within and partly above the slot 14, will not only prevent withdrawal of the roots 15 through the slot 14 but will also engage the adjacent blades 16 so as to prevent movement of the blade assembly relatively to the rotor disc 10.

The platforms 17 may be provided with holes such as shown at 17a (FIGURES 3 and 5) for the introduction therethrough of a tool to enable the plate 20 to be depressed out of the slot 14. This will permit the blade assembly to be moved relatively to the disc 10 until a blade root 15 is opposite the slot 14. The blades can then be removed from the disc.

In order to balance the rotor disc 10, the combined weight of the plate 20, housing 22, 23 and spring 21 is preferably made equal to the weight of the metal removed to produce the slot 14.

Alternatively, balancing of the rotor disc 10 may be effected by providing two slots 14 in diametrically opposed positions, each slot 14 having a plate 20 and spring 21 associated therewith. With such an arrangement, the blades 16 are introduced through either slot 14 until only two blades are left to be positioned. A plate 20 is then introduced through each slot 14 and moved into the depressed position. The two last blades 16 are then introduced, one through each of the slots 14, and the whole blade assembly is finally moved relatively to the disc 10 so as to align the plates 20 with their slots 14. When this occurs, the plates 20 will be forced into the slots 14 by the springs 21.

A modified form of springing for the plate 20 is shown in FIGURE 5. In the FIGURE 5 construction, a stem or peg 25 is secured to the underside of the plate 20. Two leaf springs 26, 27 are riveted to the stem or peg 25 and have upturned ends 28, 29 respectively. The upturned ends 28, 29 facilitate sliding of the leaf springs 26, 27 over the bottom of the groove 11.

As with the construction shown in FIGURES 3 and 4, balancing of the rotor disc 10 may be effected either by making the combined weight of the plate 20, stem or peg 25, and leaf springs 26, 27 equal to the weight of the metal removed to form the slot 14 or, alternatively, by employing two diametrically opposed slots and springs.

I claim:
1. A bladed member comprising: a support member, said support member having a circumferentially extending necked groove in its periphery provided with at least one localized widened opening, a multi-blade assembly including a plurality of blade components each having shouldered roots of a size capable of being inserted through the opening and moved within said groove, and a closure member of size capable of insertion through said opening and movable within said groove, said roots of said blade components being positioned in said groove and said blade components each abutting at least two other blade components on opposite sides thereof, said closure member being positioned in said opening and engaging the wall of the same to lock said blade components against circumferential movement relative said support member, at least one of said blade components adjacent said closure member having a surface thereon which extends externally of the groove and overlaps said opening when said closure member is positioned within said opening.

2. A bladed member as claimed in claim 1 including resilient means urging said closure member outwardly of said groove.

3. A bladed member as claimed in claim 2 wherein said closure with said resilient means has a weight equal to weight of material removed from said groove to form said localized widened opening.

4. A bladed member as claimed in claim 1 in which at least one blade component includes means for providing access to said closure member whereby said closure member may be released inwardly by said localized widened opening and moved circumferentially within said groove together with said blade components.

5. A bladed member comprising: a support member, said support member having a circumferentially extending necked groove in its periphery provided with at least one localized widened opening, a plurality of blades, said blades having shouldered roots of a size capable of being inserted through the opening and moved within said groove, a closure member, said closure member of a size capable of being inserted through the opening and moved within said groove, said blades being positioned about the periphery of said support member and having the respective roots located within said groove, each of said blades having flange means thereon disposed externally of said groove, each of said blades abutting two blades on opposite sides thereof by way of said flange means, said closure member being positioned within said opening and engaging the wall of the same, means normally urging the closure member outwardly of said opening, said flange means intermediate the blades on opposite sides of said closure member overlapping said opening and restraining said closure member from movement outwardly thereof.

References Cited in the file of this patent
UNITED STATES PATENTS

| | | |
|---|---|---|
| 1,156,529 | Hillner | Oct. 12, 1915 |
| 2,931,625 | Lechthaler et al. | Apr. 5, 1960 |

FOREIGN PATENTS

| | | |
|---|---|---|
| 659,592 | Great Britain | Oct. 24, 1951 |